US009263921B2

(12) United States Patent
Tanavde et al.

(10) Patent No.: US 9,263,921 B2
(45) Date of Patent: Feb. 16, 2016

(54) STATOR CORE COMPRESSION

(71) Applicant: General Electric Company, Schenectady, NY (US)

(72) Inventors: Anand Shankar Tanavde, Slingerlands, NY (US); Christopher Anthony Kaminski, Niskayuna, NY (US); Lakshminarayana Kanakamedala, Glenville, NY (US)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 13/934,189

(22) Filed: Jul. 2, 2013

(65) Prior Publication Data
US 2015/0008787 A1    Jan. 8, 2015

(51) Int. Cl.
*H02K 1/06* (2006.01)
*H02K 1/18* (2006.01)
*H02K 3/46* (2006.01)
*H02K 15/02* (2006.01)
*H02K 1/16* (2006.01)

(52) U.S. Cl.
CPC .. *H02K 3/46* (2013.01); *H02K 1/16* (2013.01); *H02K 15/02* (2013.01); *H02K 15/024* (2013.01); *H02K 2201/09* (2013.01); *Y10T 29/49009* (2015.01)

(58) Field of Classification Search
None
See application file for complete search history.

(56) References Cited

U.S. PATENT DOCUMENTS

| 1,784,643 | A | * | 12/1930 | Reist | H02K 1/185 |
| | | | | | 29/596 |
| 2,199,141 | A | | 4/1940 | Rice | |
| 2,199,156 | A | | 4/1940 | Grobel | |
| 2,199,351 | A | | 4/1940 | Taylor | |
| 2,424,299 | A | | 7/1947 | Baudry et al. | |
| 2,489,109 | A | | 11/1949 | Shildneck et al. | |
| 2,554,226 | A | | 5/1951 | Taylor | |

(Continued)

FOREIGN PATENT DOCUMENTS

| GB | 1162998 | 9/1969 |
| GB | 2470466 A | 11/2010 |

(Continued)

OTHER PUBLICATIONS

Great Britain Intellectual Property Office, Search Report for Application No. GB1018954.6 dated Aug. 4, 2011, 3 pages.

(Continued)

*Primary Examiner* — Tran Nguyen
(74) *Attorney, Agent, or Firm* — Ernest G. Cusick; Hoffman Warnick LLC

(57) ABSTRACT

Embodiments of the invention relate generally to electromagnetic devices and, more particularly, to the compression of stator core laminations using wire rope members and to stator cores and electromagnetic devices employing such wire rope members. In one embodiment, the invention includes: affixing a first end of a wire rope member to a first flange plate disposed adjacent a first end of a plurality of stator laminations; affixing a second end of the wire rope member to a second flange plate disposed adjacent a second end of the plurality of stator laminations; tensioning at least one of the first end or the second end of the wire rope member against at least one of the first flange plate and the second flange plate to exert a compressive force against the first flange plate, the second flange plate, and the plurality of stator laminations.

20 Claims, 7 Drawing Sheets

(56) References Cited

U.S. PATENT DOCUMENTS

| | | | |
|---|---|---|---|
| 2,561,994 A | 7/1951 | Rashevsky et al. | |
| 2,811,658 A | 10/1957 | Brainard | |
| 2,811,659 A | 10/1957 | Barlow et al. | |
| 2,846,603 A | 8/1958 | Webster et al. | |
| 3,462,624 A | 8/1969 | Darrieus | |
| 3,531,667 A | 9/1970 | Barton et al. | |
| 3,652,889 A | 3/1972 | Reece et al. | |
| 3,708,707 A | 1/1973 | Kranz | |
| 3,988,622 A | 10/1976 | Starcevic | |
| 4,110,652 A | 8/1978 | McGahern | |
| 4,204,313 A | 5/1980 | Khutoretsky et al. | |
| 4,425,523 A | 1/1984 | Detinko et al. | |
| 4,469,973 A | 9/1984 | Guyot et al. | |
| 4,536,671 A | 8/1985 | Miller | |
| 4,634,909 A | 1/1987 | Brem | |
| 4,663,553 A | 5/1987 | Zimmermann | |
| 4,864,176 A * | 9/1989 | Miller | H02K 19/20 310/168 |
| 4,891,540 A | 1/1990 | Cooper et al. | |
| 5,006,748 A * | 4/1991 | Wintermute | H02K 1/12 310/194 |
| 5,796,191 A | 8/1998 | Schwanda | |
| 5,875,540 A | 3/1999 | Sargeant et al. | |
| 6,104,116 A | 8/2000 | Fuller et al. | |
| 6,144,129 A | 11/2000 | Fuller et al. | |
| 6,321,439 B1 | 11/2001 | Berrong et al. | |
| 6,346,760 B1 | 2/2002 | Boardman, IV | |
| 6,498,417 B2 | 12/2002 | Fuller | |
| 6,628,027 B2 | 9/2003 | Fuller | |
| 6,720,699 B1 | 4/2004 | Shah et al. | |
| 6,772,900 B2 | 8/2004 | Turner et al. | |
| 6,775,900 B2 | 8/2004 | Dawson et al. | |
| 7,202,587 B2 | 4/2007 | Sargeant et al. | |
| 7,302,754 B2 | 12/2007 | Majernik et al. | |
| 7,353,586 B2 | 4/2008 | Majernik et al. | |
| 7,397,163 B2 | 7/2008 | Cook et al. | |
| 7,714,477 B2 | 5/2010 | Nagashima et al. | |
| 7,827,676 B2 | 11/2010 | Allen et al. | |
| 7,923,891 B2 | 4/2011 | Kikuichi | |
| 7,946,028 B2 | 5/2011 | Majernik et al. | |
| 8,040,014 B2 | 10/2011 | Boardman, IV et al. | |
| 8,138,654 B2 | 3/2012 | Boardman, IV | |
| 8,319,405 B2 | 11/2012 | Allen et al. | |
| 2011/0109187 A1 | 5/2011 | Tanavde et al. | |
| 2011/0210643 A1 | 9/2011 | Tanavde et al. | |
| 2012/0043861 A1 | 2/2012 | Allen et al. | |
| 2012/0104760 A1 | 5/2012 | Tanavde et al. | |

FOREIGN PATENT DOCUMENTS

| | | |
|---|---|---|
| GB | 2470467 A | 11/2010 |
| GB | 2740466 A | 11/2010 |
| GB | 2475599 A | 5/2011 |
| GB | 2478191 | 8/2011 |
| JP | S54162107 A | 12/1979 |
| JP | 55086348 A | 6/1980 |
| JP | 61049629 A | 3/1986 |
| JP | S61244238 A | 10/1986 |
| JP | 62260538 A | 11/1987 |
| JP | 2007166726 A | 6/2007 |
| WO | 0057535 A1 | 9/2000 |

OTHER PUBLICATIONS

Mullins, Office Action Communication for U.S. Appl. No. 12/622,751 dated Jan. 7, 2011, 11 pages.
Mullins, Office Action Communication for U.S. Appl. No. 12/622,751 dated May 20, 2011, 13 pages.
Mullins, Notice of Allowance and Fee(s) Due for U.S. Appl. No. 12/622,751 dated Jul. 18, 2011, 11 pages.
Legendre, Office Action Communication for U.S. Appl. No. 12/915,535 dated Sep. 18, 2013, 60 pages.
Great Britain Intellectual Property Office, Search Report for Application No. GB1103083.0 dated Jun. 24, 2011, 4 pages.
Andrews, Office Action Communication for U.S. Appl. No. 12/713,505 dated Jun. 21, 2011, 24 pages.
Great Britain Intellectual Property Office, Search Report for Application No. GB1018954.6 dated Mar. 9, 2011, 5 pages.
Great Britain Intellectual Property Office, Search Report Under Section 17 for Application No. GB1118413.2 dated Feb. 23, 2012, 1 page.
Legendre, Notice of Allowance and Fee(s) Due for U.S. Appl. No. 12/915,535 dated Apr. 30, 2014, 13 pages.
Legendre, Notice of Allowance and Fee(s) Due for U.S. Appl. No. 12/915,535, dated Apr. 30, 2014, 13 pages.
U.S. Appl. No. 12/915,535, Notice of Allowance and Fees due dated Dec. 18, 2013.
DYWIDAG-Systems International, "DYWIDAG Post-Tensioning Systems; Multistrand Systems; Bar Systems; Repair and Strengthening," Apr. 2006, 31 pages, retrieved from: http://www.dsiamerica.com/uploads/media/DSI-USA_Bonded-Post-Tensioning-Systems_us_01.pdf.
AMSYSCO, "Material Properties of Post-Tension Strands," Jan. 2010, 3 pages, retrieved from: http://www.amsyscoinc.com/2010/01/29/material-properties-of-post-tension-strands/.
Post-Tensioning Institute, "What is Post-Tensioning?," Dec. 2000, 2 pages, retrieved from: http://www.dsiamerica.com/uploads/media/DSI-USA_What.is_Post-Tensioning_us_02.pdf.
VSL, "VSL Post-Tensioning Technology," 2013, 10 pages, retrieved from: http://www.vsl.com/index.php?option=com_content&task=blogcategory&id=17&itemid=86.
Tensioning Materials for Prestressed Concrete, "Ultra-high Strength Prestressing Strand," 1 page, retrieved from: http://www.sei-ssw.co.jp/en/pdf/prestressed_concrete_catalog_05.pdf.
Sumitomo Electric, "Super-High_Tension Prestressed Concrete Strand 15.7 mm in Diameter," 2013, 2 pages, Newsletter "Sei News," vol. 414, retrieved from: http://global-sei.com/sn/20121414/3a.html.

* cited by examiner

STATOR CORE COMPRESSION

BACKGROUND OF THE INVENTION

Stator cores of electromagnetic machines are made up of many thin steel laminations stacked together to form a large cylindrical body. Each lamination comprises a segment of a circular cross-section making up the cylindrical body. Maintaining the integrity of these thin laminations as a stator core requires inward compression exerted from either end of the stacked laminations.

In known machines, this compressive force is imparted by a plurality of rigid key bars extending from one end of the stator to the other. Typically, the laminations include dovetail slots or similar features that correspond to a compatible dovetail or similar feature on the key bars. Individual components of the stator core are stacked at either end of the stator and compressive force applied to the stator core by torquing a nut at either or both end of each of the key bars. Typically, each lamination is placed onto an assembly frame or system of rails and a compressive force applied following the installation of each lamination or after a few laminations have been installed.

BRIEF DESCRIPTION OF THE INVENTION

In one embodiment, the invention provides a method of exerting a compressive force to components of a stator core of an electromagnetic machine, the method comprising: affixing a first end of a wire rope member to a first flange plate disposed adjacent a first end of a plurality of stator laminations; affixing a second end of the wire rope member to a second flange plate disposed adjacent a second end of the plurality of stator laminations; tensioning at least one of the first end or the second end of the wire rope member against at least one of the first flange plate and the second flange plate to exert a compressive force against the first flange plate, the second flange plate, and the plurality of stator laminations.

In another embodiment, the invention provides a stator core for an electromagnetic device, the stator core comprising: a plurality of stacked stator laminations; at least one flange member adjacent a first end of the plurality of stacked stator laminations; and a wire rope member attached to the at least one flange member, the at least one wire rope member, upon tensioning, exerting a compressive force against the at least one flange member.

In still another embodiment, the invention provides an electromagnetic device comprising: a plurality of stacked stator laminations; at least one flange member adjacent a first end of the plurality of stacked stator laminations; and a wire rope member attached to the at least one flange member, the at least one wire rope member, upon tensioning, exerting a compressive force against the at least one flange member.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Embodiments of the present invention comprise methods for the assembly of stator cores using flexible wire rope rather than rigid key bars, as well as systems for the assembly of such stator cores and stator cores assembled according to such methods or using such systems.

Figure 1:
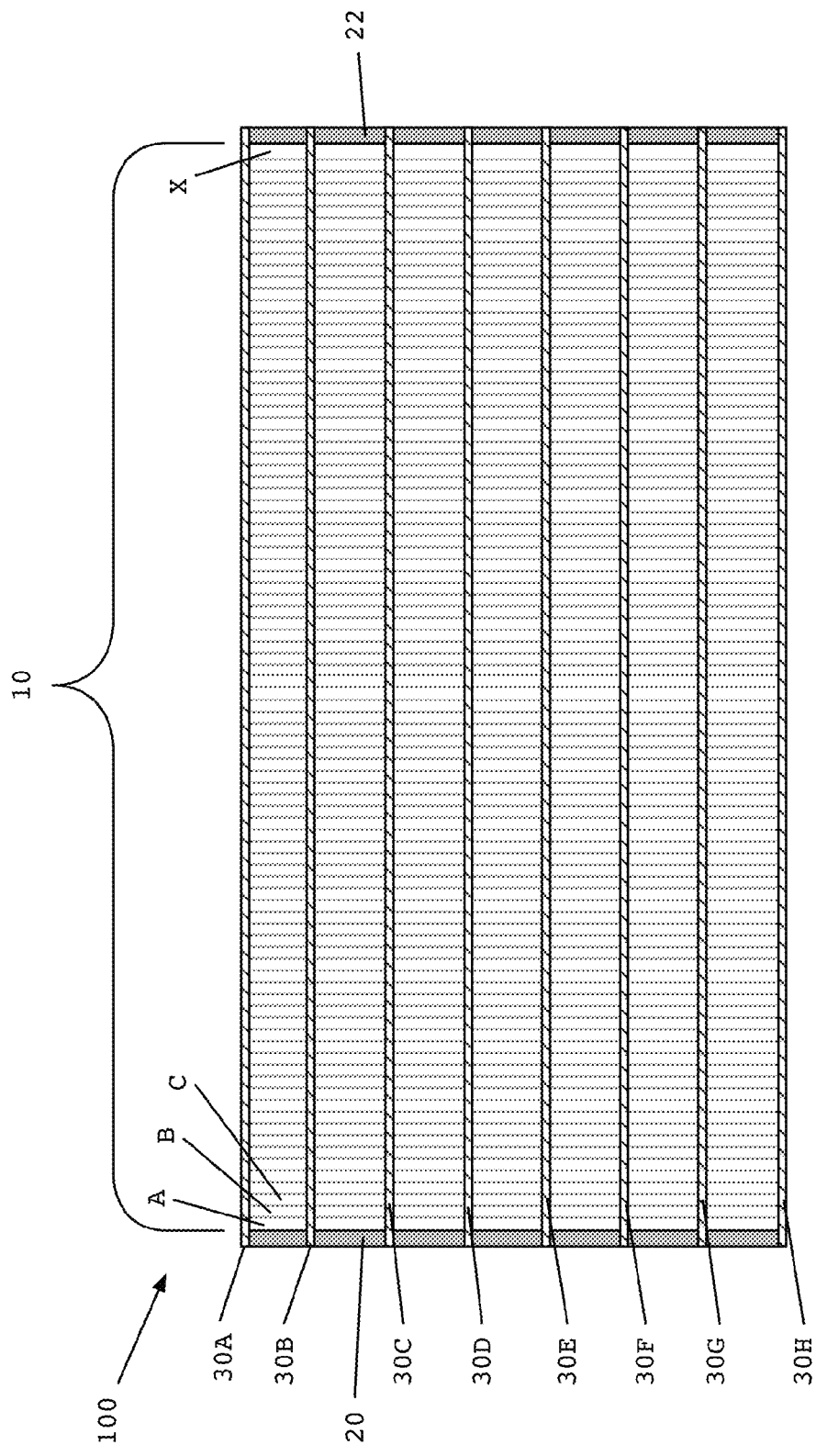
FIG. 1 shows an axial cross-sectional view of a stator core according to an embodiment of the invention.

Turning now to the drawings, FIG. 1 shows a schematic side view of a stator core 100 according to one embodiment of the invention. Here, stator core 100 comprises a plurality 10 of stacked laminations A, B, C . . . X disposed between a pair of flange plates 20,22. Typically, laminations A, B, C . . . X comprise thin insulated steel plates, which may number in the hundreds or thousands, depending on the application to which the stator core 100 will be put. Flange plates 20, 22 are typically comprised of steel or aluminum, although other materials may be used.

A plurality of wire rope members 30A through 30H extend from the first flange plate 20 to the second flange plate 22. Wire rope members may include any number of materials, including, for example, solid metal wires, twisted or braided metal wires, polyethylene fibers, nylon fibers, etc. In some embodiments of the invention, the wire rope members comprise wire rope made up of a plurality of braided metal strands surrounding a solid or braided metal core. Other materials are possible, of course, and the term "wire rope member," as used herein, is intended to refer broadly to a flexible wire capable of imparting a compressive force to a plurality of stacked laminations.

Figure 2:
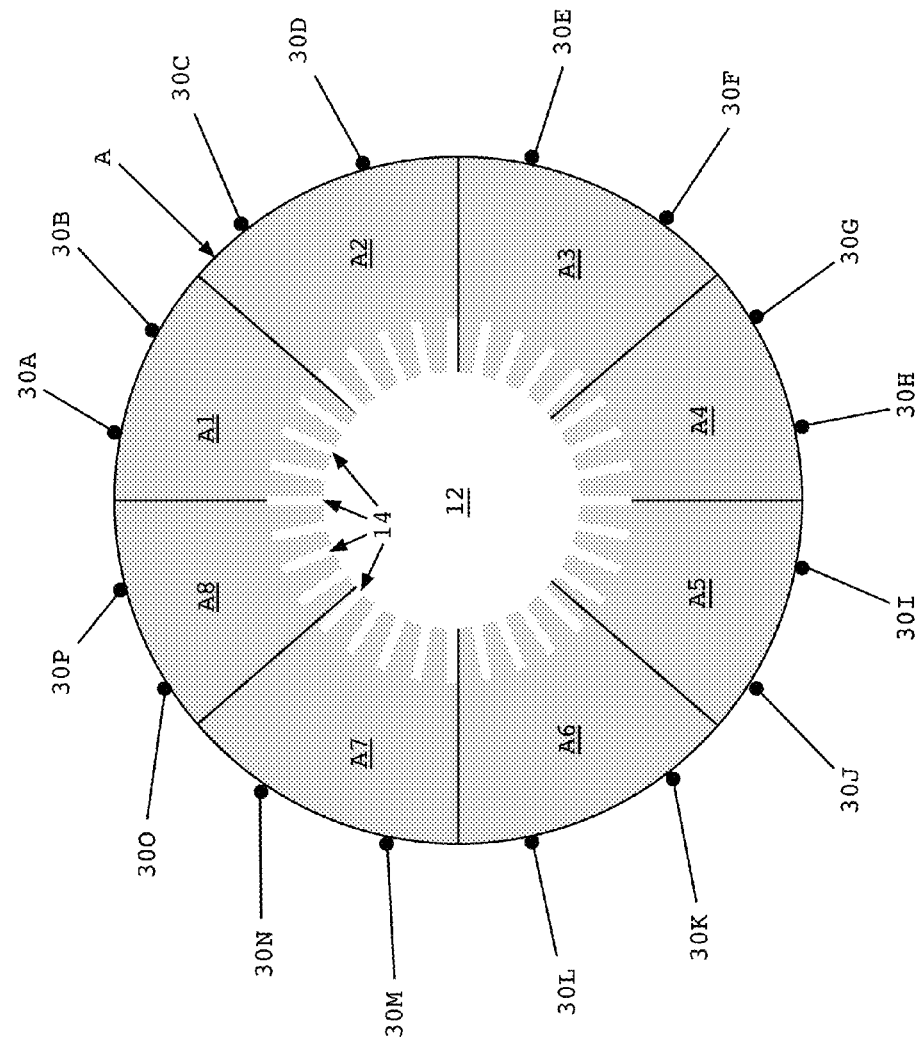
FIG. 2 shows a radial cross-sectional view of a stator core according to an embodiment of the invention.

FIG. 2 shows a cross-sectional view of the stator core 100 of FIG. 1 taken along the plane of lamination A. As can be seen in FIG. 2, lamination A includes a plurality of segments A1 through A8. Although lamination A is shown as comprising eight segments in FIG. 2, one skilled in the art will recognize that any number of segments may be employed. When assembled, segments A1 through A8 form a central bore 12 having a plurality of slots 14 for containing stator windings (not shown).

A plurality of wire rope members 30A through 30P are disposed around lamination A. As shown in FIG. 2, each segment of lamination A includes two wire rope members along its outer surface, although this is not essential. Any number of wire rope members may be employed, with any portion of the total number of wire rope members being disposed adjacent each of the segments of lamination A.

Figure 3:
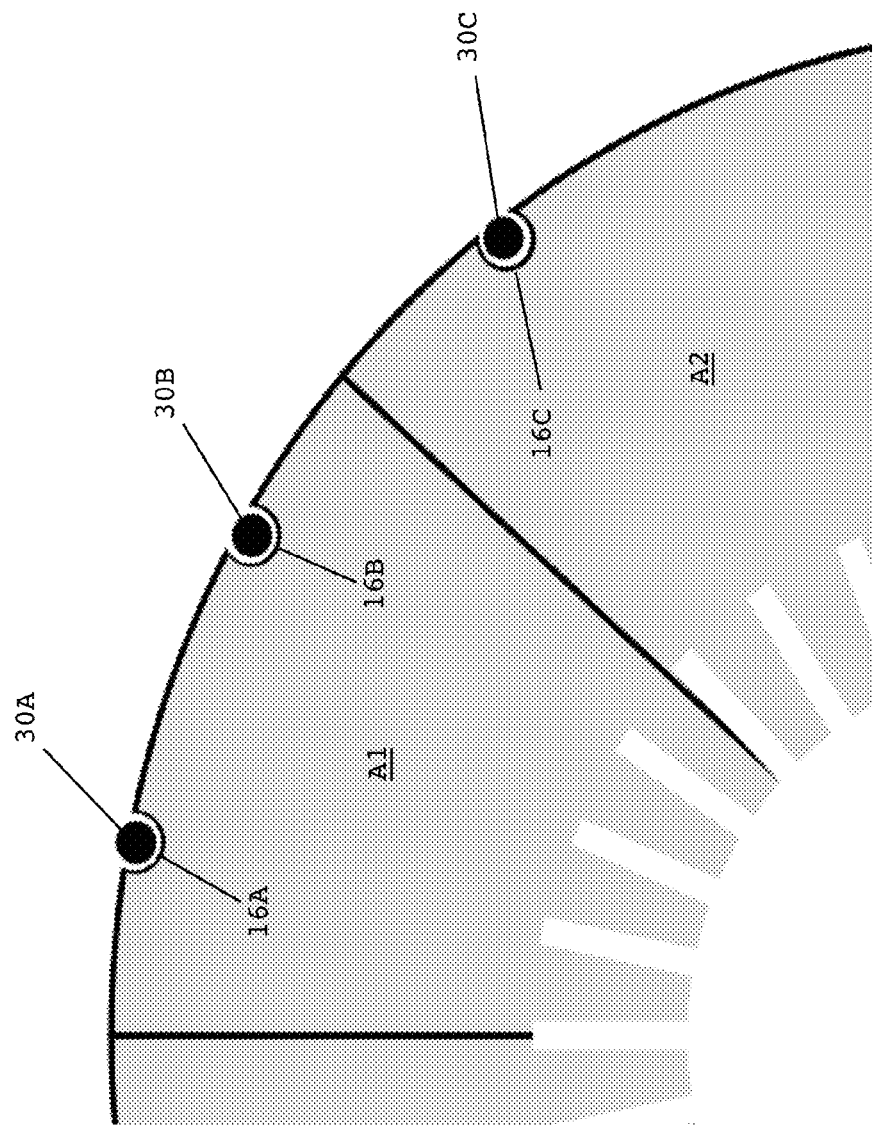
FIGS. 3-4 show detailed radial cross-sectional views of portions of stator cores according to other embodiments of the invention.

FIG. 3 shows a detailed view of a portion of segments A1, A2 according to another embodiment of the invention. Here, segment A1, representative of each of the segments, includes channels 16A, 16B into which wire rope members 30A, 30B, respectively, may be disposed. In some embodiments, channels 16A, 16B include openings greater than the diameters of wire rope member 30A, 30B, respectively. In other embodiments, channels 16A, 16B include openings larger than the diameters of wire rope members 30A, 30B, respectively, such that wire rope members 30A, 30B may be threaded through adjacently stacked laminations of the stator core.

Figure 4:
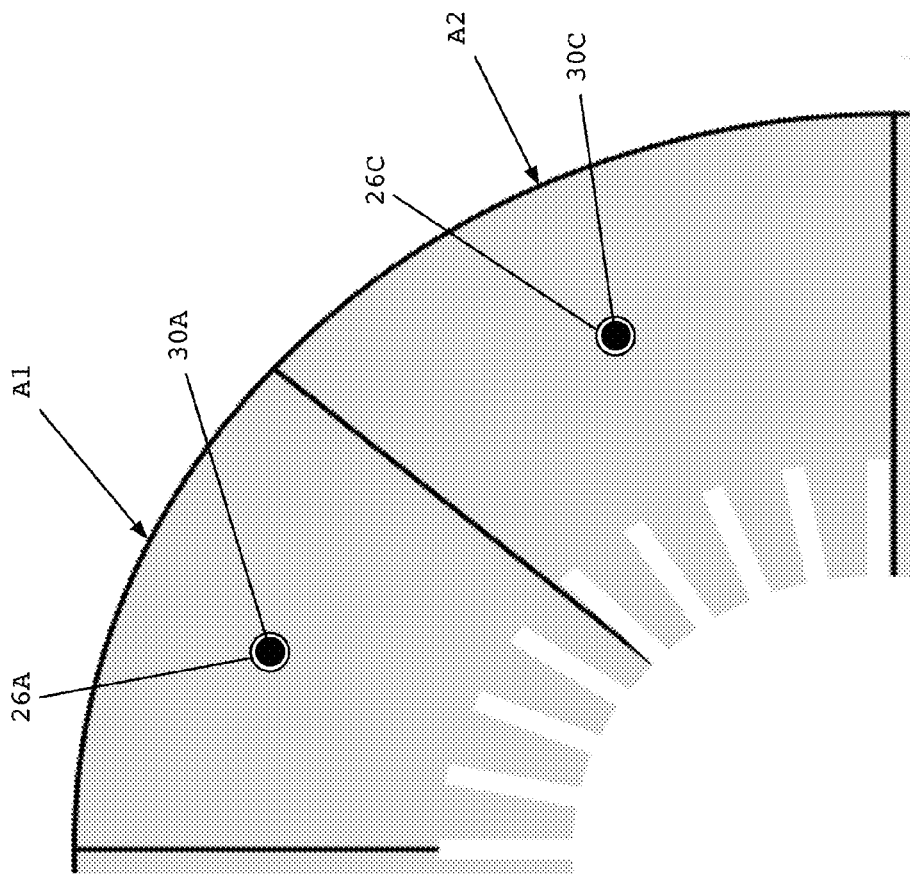

In other embodiments, such as that shown in FIG. 4, the wire rope members 30A, 30C may be threaded through axial holes 26A, 26C, respectively, in segments A1 and A2. The placement of axial holes 26A, 26C may be matched to create uniform compressive stress in the stator core. One skilled in the art will recognize that some embodiments of the invention may include features of both FIG. 3 and FIG. 4.

Embodiments of the invention, such as those shown in FIGS. 1-4, may be useful in the assembly of stator core 100 (FIG. 1). For example, pre-stress in the wire rope members may be adjusted during various stages of the assembly of a stator core and/or during the subsequent installation of the stator core in a supporting frame. Such adjustment of the tension may aid in the stacking of stator core laminations and/or movement of the assembled stator core.

Figure 5:
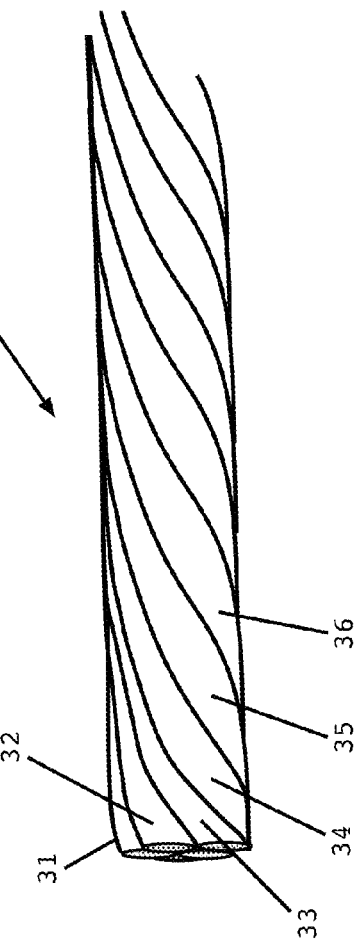
FIG. 5 shows a schematic view of a portion of a wire rope member used in some embodiments of the invention.
Figure 6:
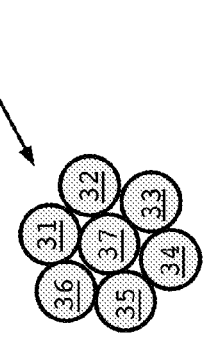

FIGS. 5-6 show views of wire rope members according to various embodiments of the invention. FIG. 5 shows a side view of a wire rope member 30 comprising a plurality of braided wire strands 31-36. FIG. 6 shows a radial cross-sectional view of wire rope member 30, showing wire strands 31-36 disposed about a central wire strand 37. In some embodiments, strands 31-36 may include flattened rather than rounded surfaces to improve contact friction.

Figure 7:
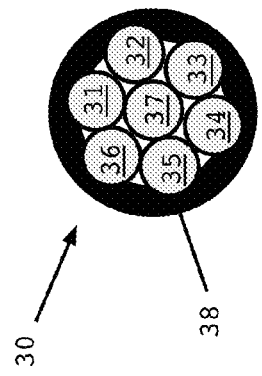
FIGS. 6-7 show schematic cross-sectional views of wire rope members used in some embodiments of the invention.

FIG. 7 shows a radial cross-sectional view of wire rope member 30 including an optional insulating layer 38. Insulating layer 38 may include any number of materials, including, for example, rubbers, vinyls, polypropylene, polyethylene, epoxies, polyethylene, etc. Insulating layer 38 reduces fretting of wire strands 31-36, which might otherwise occur upon contact with flange plates 20, 22 or the laminations of the stator core. It should be noted that insulating layer 38 may be affixed to wire rope member 30 or, in some embodiments of the invention, may surround wire rope member 30, such that wire rope member 30 may be threaded into and through insulating layer 38.

Figure 8:
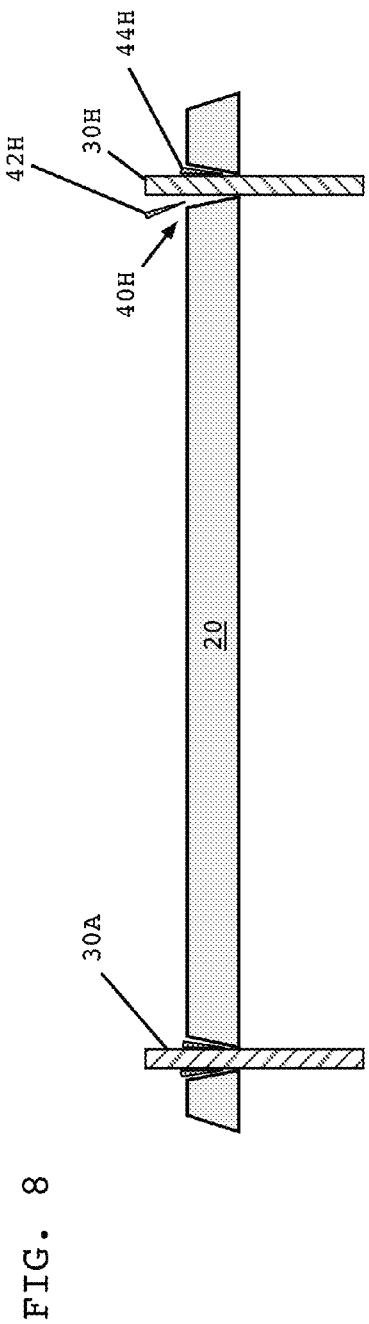
FIG. 8 shows a cross-sectional side view of a wire rope member and attachment device used in some embodiments of the invention.

FIG. 8 shows a cross-sectional side view of flange plate 20 according to an embodiment of the invention. For the sake of simplicity, the interaction of wire rope members and flange plate 20 will be described with respect to wire rope member 30H only. Flange plate 20 includes a conically-shaped passage 40H through which wire rope member 30H may be passed. Passage 40H may include a locking mechanism for securing wire rope member 30H within passage 40H. As shown in FIG. 8, such a locking mechanism includes a plurality of wedge-shaped members 42H, 44H adapted to compress and secure wire rope member 30H within passage 40H. Wedge-shaped member 42H, 44H include a first surface for contacting wire rope member 30H and a second member for contacting a wall of passage 40H. Wedge-shaped members 42H, 44H, as their name suggests, include a narrower end and a wider end. Wire rope member 30H may be tensioned within passage 40H by drawing wire rope member 30H through passage 40H, i.e., from the narrower end toward the wider end of wedge-shaped member 42H, 44H.

Figure 9:
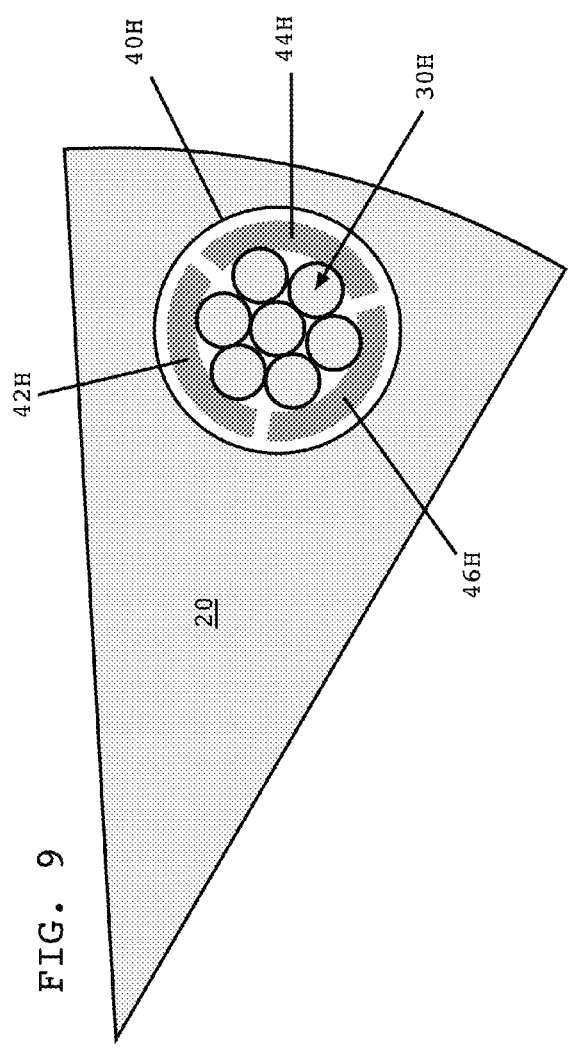
FIG. 9 shows a top view of FIG. 8.

FIG. 9 shows a top view of a portion of flange plate 20 including passage 40H. Here, three wedge-shaped members 42H, 44H, 46H restrain wire rope member 30H within passage 40H.

Stator cores employing wire rope members as described above provide a number of advantages over conventional key bar stator cores. Wire rope, for example, has a higher breaking strength, typically greater than 250 ksi, than key bars. As a consequence, a greater compressive force may be exerted upon stacked laminations than is possible using key bars.

Wire rope members may also be secured and tensioned using any number of devices and techniques. For example, various devices are commercially available for tensioning wire rope members. Such devices may be employed to tension wire rope members from either or both ends of the stator core by drawing the wire rope members away from the flange plates and the laminations along a longitudinal axis of the stator core.

In addition, the use of wire ropes permits pre-assembly of a plurality of laminations and their segments, which is not possible using key bars to compress the stator core. Such pre-assembly can greatly reduce assembly time and costs.

Figure 10:
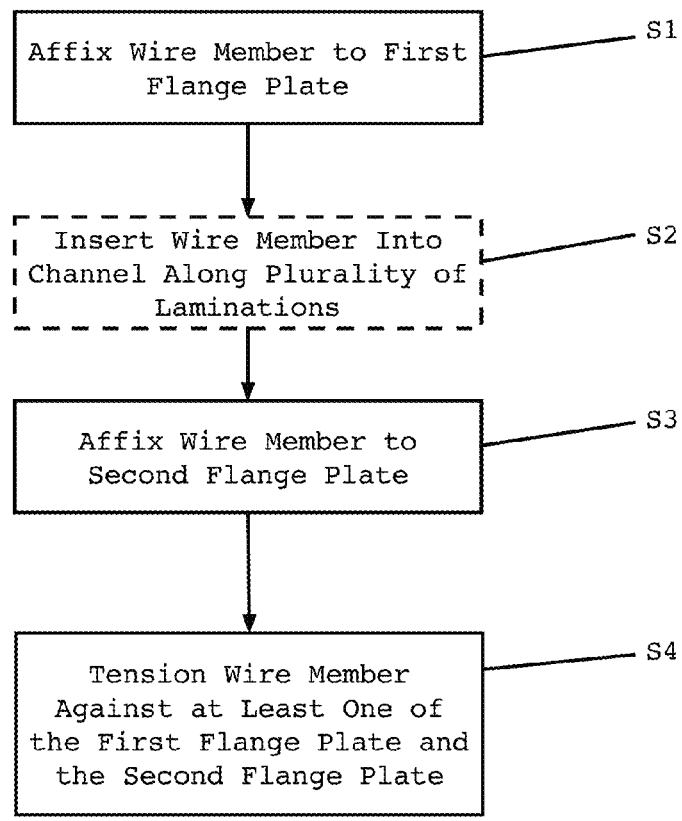
FIG. 10 shows a flow diagram of a method according to an embodiment of the invention.

FIG. 10 shows a flow diagram of a method according to an embodiment of the invention. At S1, a wire rope member is affixed to a first flange plate adjacent a first end of a plurality of stacked stator laminations. At S2, the wire rope member may optionally be inserted into a channel along each of the plurality of stacked stator laminations. At S3 the wire rope member is affixed to a second flange plate adjacent a second end of the plurality of stacked stator laminations. At S4, the wire rope member is tensioned against at least one of the first flange plate and the second flange plate, thereby applying a compressive force against the plurality of stacked stator laminations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of exerting a compressive force to components of a stator core of an electromagnetic machine, the method comprising:
    affixing a first end of a wire rope member to a first flange plate disposed adjacent a first end of a plurality of stator laminations;
    affixing a second end of the wire rope member to a second flange plate disposed adjacent a second end of the plurality of stator laminations; and
    tensioning at least one of the first end or the second end of the wire rope member against at least one of the first flange plate and the second flange plate to exert a compressive force against the first flange plate, the second flange plate, and the plurality of stator laminations.

2. The method of claim 1, wherein the affixing includes inserting the first end or the second end of the wire rope member into a first channel in the first flange plate or a second channel in the second flange plate.

3. The method of claim 2, wherein at least one of the first end or the second end of the wire rope member includes an anchor device for constraining the wire rope member within at least one of the first channel or the second channel.

4. The method of claim 3, wherein the anchor device includes at least one wedge-shaped member having a first surface for contacting the wire rope member and a second member for contacting a wall of the first channel or the second channel.

5. The method of claim 4, wherein the tensioning includes drawing the wire rope member from a narrower end of the wedge-shaped member toward a wider end of the wedge-shaped member.

6. The method of claim 1, wherein at least one of the first channel or the second channel includes an anchor device for constraining the wire rope member.

7. The method of claim 6, wherein:
the anchor device includes at least one wedge-shaped member having a first surface for contacting the wire rope member and a second member for contacting a wall of the first channel or the second channel; and
the tensioning includes drawing the wire rope member from a narrower end of the wedge-shaped member toward a wider end of the wedge-shaped member.

8. The method of claim 1, wherein the wire rope member is selected from a group consisting of: a metal wire, a wire rope, and a braided wire rope.

9. The method of claim 1, further comprising:
inserting the wire rope member into a channel disposed along a length of the stator core.

10. A stator core for an electromagnetic device, the stator core comprising:
a plurality of stacked stator laminations;
at least one flange member adjacent a first end of the plurality of stacked stator laminations; and
a wire rope member attached to the at least one flange member, the at least one wire rope member, upon tensioning, exerting a compressive force against the at least one flange member.

11. The stator core of claim 10, wherein the at least one flange member includes:
a first flange member adjacent the first end of the plurality of stacked stator laminations; and
a second flange member adjacent a second end of the plurality of stacked stator laminations.

12. The stator core of claim 11, wherein the wire rope member is attached to both the first flange member and the second flange member and, upon tensioning, the wire rope member exerts the compressive force against both the first flange member and the second flange member.

13. The stator core of claim 10, wherein the at least one flange member includes:
a first flange member adjacent the first end of the plurality of stacked stator laminations; and
a second flange member adjacent a second end of the plurality of stacked stator laminations.

14. The stator core of claim 13, wherein the wire rope member lies within a channel along each of the plurality of stacked stator laminations.

15. The stator core of claim 10, wherein at least one of a first end and a second end of the wire rope member includes a locking mechanism for securing the wire rope member to the at least one flange member.

16. The stator core of claim 10, wherein the wire rope member includes a plurality of wire rope members circumferentially-disposed about the plurality of stacked stator laminations.

17. The stator core of claim 10, wherein the wire rope member is selected from a group consisting of: a metal wire, a wire rope, a braided wire rope, polyethylene fibers, and nylon fibers.

18. The stator core of claim 10, further comprising:
a passage disposed along a length of each of the plurality of stacked stator laminations.

19. An electromagnetic device comprising:
a plurality of stacked stator laminations;
at least one flange member adjacent a first end of the plurality of stacked stator laminations; and
a wire rope member attached to the at least one flange member, the at least one wire rope member, upon tensioning, exerting a compressive force against the at least one flange member.

20. The electromagnetic device of claim 19, wherein:
the at least one flange member includes a first flange member adjacent the first end of the plurality of stacked stator laminations and a second flange member adjacent a second end of the plurality of stacked stator laminations; and
the wire rope member includes a plurality of wire rope members circumferentially-disposed about the plurality of stacked stator laminations, each attached to the first flange member and the second flange member and exerts the compressive force against the first flange member and the second flange member.

* * * * *